(12) United States Patent
Huang

(10) Patent No.: US 11,928,312 B2
(45) Date of Patent: Mar. 12, 2024

(54) METHOD FOR DISPLAYING DIFFERENT APPLICATION SHORTCUTS ON DIFFERENT SCREENS

(71) Applicant: Honor Device Co., Ltd., Shenzhen (CN)

(72) Inventor: Qing Huang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/588,691

(22) Filed: Jan. 31, 2022

(65) Prior Publication Data

US 2022/0155919 A1 May 19, 2022

Related U.S. Application Data

(63) Continuation of application No. 16/768,490, filed as application No. PCT/CN2017/114030 on Nov. 30, 2017, now Pat. No. 11,625,144.

(51) Int. Cl.
*G06F 3/0482* (2013.01)
*G06F 3/04817* (2022.01)
(Continued)

(52) U.S. Cl.
CPC ........ *G06F 3/0482* (2013.01); *G06F 3/04817* (2013.01); *G06F 3/0483* (2013.01);
(Continued)

(58) Field of Classification Search
CPC .. G06F 3/0482; G06F 3/0483; G06F 3/04817; G06F 3/04883;
(Continued)

(56) References Cited

U.S. PATENT DOCUMENTS 6,710,788 B1 * 3/2004 Freach ................. G06F 3/0481
715/782
6,934,911 B2 * 8/2005 Salmimaa ......... H04M 1/72472
455/412.2
(Continued)

FOREIGN PATENT DOCUMENTS

CN 103530220 A 1/2014
CN 103747334 A 4/2014
(Continued)

OTHER PUBLICATIONS

XP055735373 "uBar—The Dock replacement for the Mac.," Sep. 24, 2017, 6 pages.
(Continued)

*Primary Examiner* — Justin R. Blaufeld
(74) *Attorney, Agent, or Firm* — Conley Rose, P.C.

(57) ABSTRACT

A terminal includes a memory containing instructions, and a processor coupled to the memory and configured to execute the instructions to cause the terminal to display a first home screen, where a non-docked bar on the first home screen comprises a first application icon corresponding to a first application, and where the first application is a latest installed application; detect a first user operation; and display, in response to the first user operation, the second home screen. The second home screen includes a first area, a second area, and a third area. The second area includes one or more most frequently used application icons, including a second application icon corresponding to a second application. The third area includes one or more latest installed application icons, including the first application icon, and the first area includes the second application icon.

20 Claims, 9 Drawing Sheets

(51) Int. Cl.
  *G06F 3/0483* (2013.01)
  *H04M 1/72406* (2021.01)
  *H04M 1/72454* (2021.01)
  *H04M 1/72472* (2021.01)
  *G06F 3/04883* (2022.01)

(52) U.S. Cl.
  CPC ... *H04M 1/72406* (2021.01); *H04M 1/72454* (2021.01); *H04M 1/72472* (2021.01); *G06F 3/04883* (2013.01); *G06F 2203/04803* (2013.01)

(58) Field of Classification Search
  CPC .... G06F 2203/04803; H04M 1/72472; H04M 1/72454; H04M 1/72406
  See application file for complete search history.

(56) References Cited

U.S. PATENT DOCUMENTS

| | | | | |
|---|---|---|---|---|
| 8,453,065 | B2* | 5/2013 | Chaudhrl | G06F 3/04817 715/709 |
| 8,713,465 | B1* | 4/2014 | Jitkoff | G06F 3/04812 715/740 |
| 8,775,923 | B1* | 7/2014 | Kroeger | G06F 16/9574 715/234 |
| 9,953,101 | B1* | 4/2018 | Walliser | G06F 21/32 |
| 11,228,675 | B2* | 1/2022 | Park | H04M 1/72451 |
| 2005/0097506 | A1* | 5/2005 | Heumesser | G07C 1/10 717/102 |
| 2005/0278297 | A1* | 12/2005 | Nelson | G06F 16/958 |
| 2008/0148147 | A1* | 6/2008 | Poston | G06F 16/34 715/273 |
| 2009/0144634 | A1* | 6/2009 | Berger | G06F 1/1622 715/747 |
| 2011/0072361 | A1* | 3/2011 | Sakai | H04M 1/72403 715/745 |
| 2014/0013254 | A1* | 1/2014 | Hosein | G06F 3/04883 715/765 |
| 2014/0123022 | A1* | 5/2014 | Lee | H04M 1/72454 715/747 |
| 2014/0123054 | A1 | 5/2014 | Cai et al. | |
| 2015/0177927 | A1* | 6/2015 | Chaudhri | G06F 3/0485 715/830 |
| 2015/0200829 | A1* | 7/2015 | Dubroy | H04L 67/535 709/224 |
| 2015/0268811 | A1* | 9/2015 | Min | G06F 3/0481 715/765 |
| 2015/0324078 | A1* | 11/2015 | Dipin | G06F 3/0482 715/765 |
| 2015/0339048 | A1 | 11/2015 | Yuan et al. | |
| 2016/0062635 | A1* | 3/2016 | Feit | G06F 9/485 715/765 |
| 2016/0070466 | A1* | 3/2016 | Chaudhri | G06F 3/04883 715/765 |
| 2016/0108957 | A1 | 4/2016 | Helgesen et al. | |
| 2016/0179310 | A1* | 6/2016 | Chaudhri | G06F 3/0488 715/808 |
| 2016/0224211 | A1* | 8/2016 | Xu | G06F 3/0482 |
| 2017/0249069 | A1* | 8/2017 | Zamir | G06F 9/461 |
| 2017/0315681 | A1 | 11/2017 | Kang et al. | |
| 2017/0344194 | A1* | 11/2017 | Peterson | G06F 3/0487 |
| 2017/0357426 | A1* | 12/2017 | Wilson | G06F 9/451 |
| 2018/0189009 | A1* | 7/2018 | Feltham | G06F 3/14 |
| 2018/0217721 | A1* | 8/2018 | Baszucki | A63F 13/537 |
| 2019/0104216 | A1* | 4/2019 | Van Hecke | G06F 3/04817 |
| 2019/0179500 | A1* | 6/2019 | Kim | G06F 3/048 |
| 2020/0371685 | A1* | 11/2020 | Wang | G06F 3/04845 |

FOREIGN PATENT DOCUMENTS

| | | |
|---|---|---|
| CN | 103777869 A | 5/2014 |
| CN | 103970400 A | 8/2014 |
| CN | 104063131 A | 9/2014 |
| CN | 104978113 A | 10/2015 |
| CN | 105718145 A | 6/2016 |
| CN | 105893614 A | 8/2016 |
| CN | 105930038 A | 9/2016 |
| CN | 105955618 A | 9/2016 |
| CN | 106020648 A | 10/2016 |
| CN | 106325680 A | 1/2017 |
| CN | 106990884 A | 7/2017 |
| EP | 3043249 A1 | 7/2016 |
| JP | 2008278252 A | 11/2008 |
| KR | 20140097838 A | 8/2014 |
| WO | 2012063261 A2 | 5/2012 |

OTHER PUBLICATIONS

XP055735411, "How to Hide Recent and Suggested Apps from iPad Dock in iPadOS 13 / iOS 12 / iOS 11," Oct. 26, 2017, 10 pages.
KaWing, "What is the actual use of Microsoft's Arrow Launcher," Retrieved from the internet: https://www.pcmarket.com.hk/microsoft-%E5%87%BA%E3%80%8Aarrow-launcher%E3%80%8B%E5%AF%A6%E9%9A%9B%E6%9C%89%E4%B9%9C%E7%94%A8%EF%BC%9F%EF%BC%81/; Jul. 28, 2015; 4 pages. With English Translation.
Teddy917, "[H2OS Guide] Hydrogen Window Chapter," Retrieved from the internet: https://bbs.oneplus.com/thread/3456470; May 17, 2017; 20 pages. With English Translation.
Juli Clover, "How to Use the New iPad Dock in iOS 11," Retrieved from the internet: https://www.macrumors.com/how-to/ipad-dock-ios-11/; Sep. 19, 2017; 12 pages.
Sina Digital, "Getting started with the official version of Windows 10: a down-to-earth system," Retrieved from the internet: https://tech.sina.cn/digi/nb/2015-07-30/detail-ifxfpcys8186735.d.html?vt=4; Jul. 30, 2015; 32 pages. With English Translation.

* cited by examiner

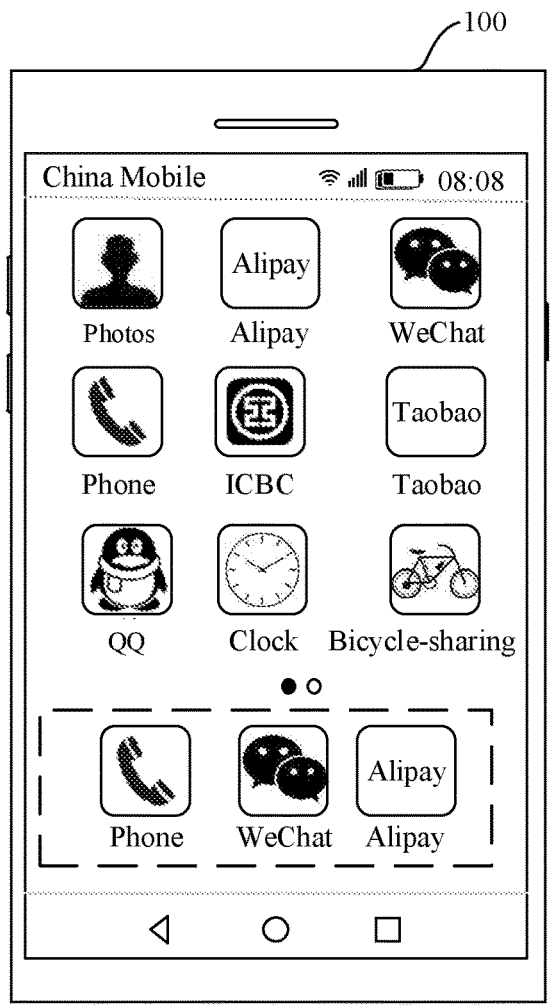
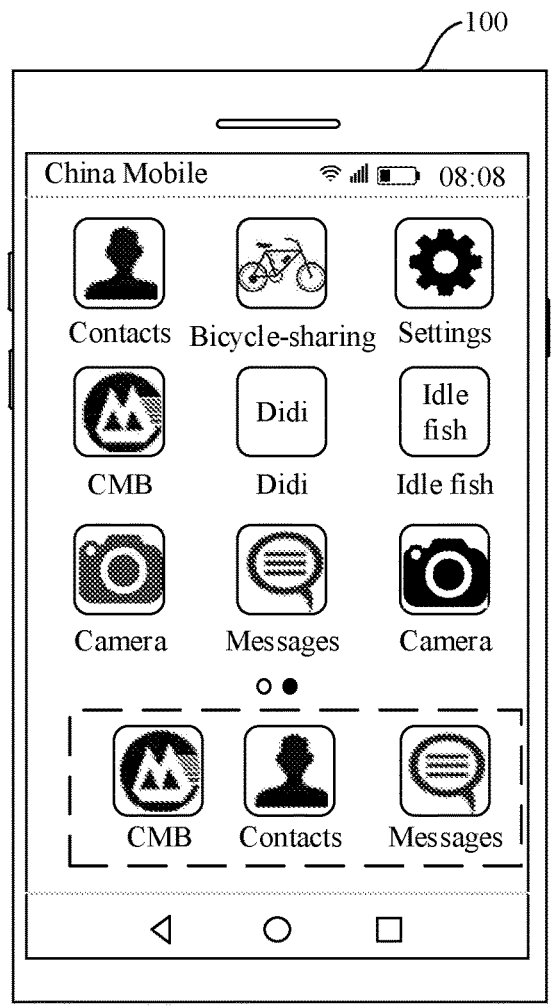
FIG. 2(1)  FIG. 2(2)

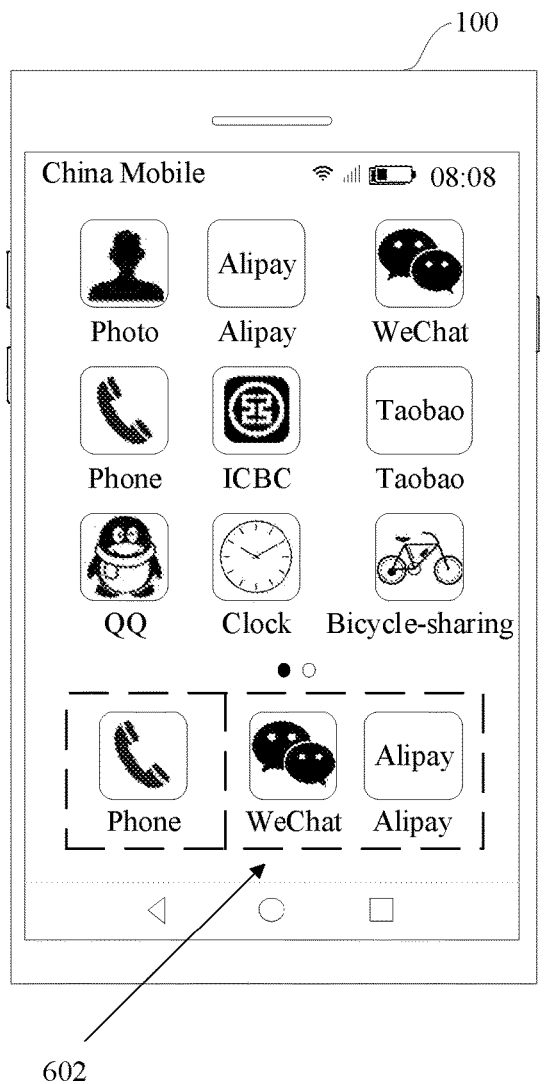
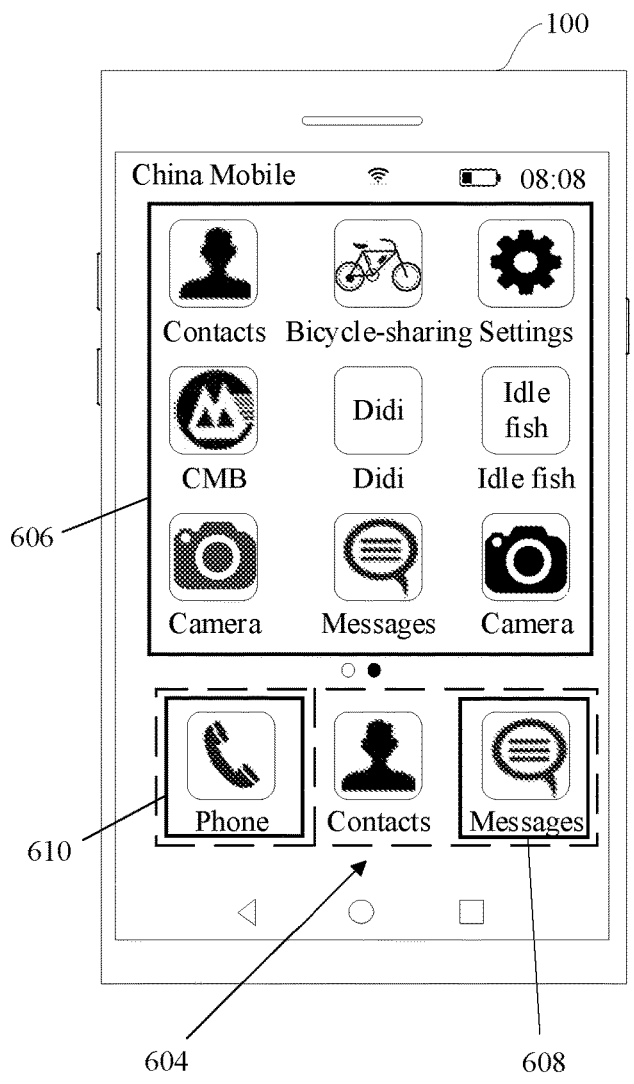
FIG. 6(1)                    FIG. 6(2)

METHOD FOR DISPLAYING DIFFERENT APPLICATION SHORTCUTS ON DIFFERENT SCREENS

This application is a continuation application of U.S. patent application Ser. No. 16/768,490, filed on May 29, 2020, which is a national stage of International Application No. PCT/CN2017/114030, filed on Nov. 30, 2017. All the afore-mentioned patent applications are hereby incorporated by reference in their entireties.

TECHNICAL FIELD

This application relates to the field of communications technologies, and in particular, to a processing method and a terminal.

BACKGROUND

Rapid development of internet technologies leads to an application increase in both type and quantity on intelligent terminals. A large quantity of applications bring a variety of applications to a user, but also bring a difficulty in quickly searching for an application to the user.

SUMMARY

This application provides a processing method, and the processing method may be applied to a terminal including a plurality of home screens, so that docked bars on different home screens on the terminal display an application icon corresponding to an application that meets a preset condition on a current home screen, and a user can quickly start the application that meets the preset condition, thereby improving user experience.

According to a first aspect, this application provides a processing method, applied to a terminal including at least a first home screen and a second home screen, where the method includes: displaying, by the terminal, the first home screen, where a docked bar on the first home screen includes a first application icon corresponding to a first application; and automatically determining, by the terminal, a second application that meets a preset condition, and replacing the first application icon on the docked bar on the first home screen with a second application icon, where the second application icon corresponds to the second application, and the preset condition is at least one of the following conditions: an application that is most frequently used, an application that is latest installed, an application that is latest updated, and an application that is abnormally exited.

The first application icon is a shortcut corresponding to the first application, and a user may operate the first application icon to quickly start the first application. The second application icon is a shortcut corresponding to the second application, and the user may operate the second application icon to quickly start the second application. A non-docked bar on the first home screen includes an application icon corresponding to the first application and an application icon corresponding to the second application. The application icon corresponding to the second application included on the non-docked bar on the first home screen may be denoted as a third application icon.

It should be noted that the first application may be a third application in step S301, and the first application icon may be a third application icon in step S301. The second application may be a fourth application in step S302, and the second application icon may be a fourth application icon in step S302.

Therefore, in this embodiment of this application, different application shortcuts are displayed on different home screens, so that the user can quickly start an application on a current home screen, thereby improving user experience.

In a possible design, the automatically determining, by the terminal, a second application that meets a preset condition includes: automatically determining, by the terminal from an application corresponding to an application icon included on the non-docked bar on the first home screen, that an application that meets the preset condition is the second application.

It should be noted that the second application icon on the docked bar on the first home screen is the application shortcut generated corresponding to the second application that is automatically determined by the terminal from an application on the first home screen based on a user's application use habit and that meets the preset condition. The application on the first home screen may be applications corresponding to all application icons included on the first home screen, or may be applications corresponding to all application icons displayed on the first home screen.

In a possible design, the method further includes: detecting, by the terminal, a first operation of a user, in response to the detected first operation, displaying, by the terminal, a screen including at least one policy option; and detecting, by the terminal, a user's selection operation on the at least one policy option, and determining, by the terminal, the preset condition based on a policy option selected by the user.

In a possible design, the docked bar on the first home screen further includes an application icon corresponding to a third application, and the non-docked bar on the first home screen does not include the application icon corresponding to the third application. The third application is an application that is automatically determined by the terminal based on applications corresponding to application icons included on non-docked bars on all home screens and that meets the preset condition.

The preset condition may be set by the user, namely, a presentation policy set by the user, specifically including a screen-related policy and a screen-unrelated policy. Being screen-related means that analysis and comparison are performed based on only an application on a current screen. Being screen-unrelated means that analysis and comparison are performed based on all applications on the terminal.

For example, it is assumed that a docked bar on each home screen on the terminal includes a maximum of P application icons. First, the terminal may specify that a screen-unrelated policy is used for Q application icons. In this case, the Q application icons on the docked bar on each home screen on the terminal are application icons corresponding to Q applications that are automatically determined by the terminal from applications included on non-docked bars on all home screens and that meet the preset condition. It can be learned that the Q application icons on the docked bar on each home screen are the same. Second, the terminal may further specify that a screen-related policy is used for the other (P-Q) application icons. In this case, the (P-Q) application icons on each screen on the terminal are application icons corresponding to (P-Q) applications that are automatically determined by the terminal from application included on a non-docked bar on each home screen and that meet the preset condition. It can be learned that the (P-Q) application icons on the docked bar on each home screen are different.

In a possible design, the replacing the first application icon on the docked bar on the first home screen with a second application icon specifically includes: replacing, by the terminal, the first application icon on the docked bar on the first home screen with the second application icon, and keeping an application icon included on the non-docked bar on the first home screen unchanged.

In a possible design, the method further includes: in response to a user's operation of switching from the first home screen to the second home screen, displaying, by the terminal, the second home screen, where a docked bar on the second home screen includes a fourth application icon corresponding to a fourth application, and the first home screen does not include an application icon corresponding to the fourth application.

In a possible design, the fourth application is an application that is automatically determined by the terminal from an application corresponding to an application icon included on a non-docked bar on the second home screen and that meets the preset condition.

It should be further noted that displaying an application shortcut on a docked bar on a home screen is merely a display manner in this embodiment of this application. In this application, the application shortcut may be displayed on a floating window on a home screen, or the application shortcut may be displayed on HiBoard, a notification bar, or the like. A specific form for displaying the application shortcut is not limited in this application.

It should be further noted that if the terminal has a total of M home screens, each home screen can display N application shortcuts. In this embodiment of this application, different application shortcuts can be displayed on different home screens. This is equivalent to that a total of M×N shortcuts can be displayed on the terminal. It can be learned that in this embodiment of this application, a quantity of application shortcuts presented on the terminal can also be increased, thereby helping improve user experience.

According to a second aspect, this application provides a processing method, applied to a terminal including at least a first home screen and a second home screen, where the method includes: displaying, by the terminal, the first home screen, where a docked bar on the first home screen includes a first application icon corresponding to a first application; detecting, by the terminal, a user's operation, where the operation is used to instruct the terminal to switch from the first home screen to the second home screen; and in response to the user's operation detected by the terminal, displaying, by the terminal, the second home screen, where a docked bar on the second home screen includes a second application icon corresponding to a second application, and the second application is different from the first application.

In a possible design, a non-docked bar on the first home screen includes a third application icon corresponding to the first application, and the non-docked bar on the first home screen further includes a fourth application icon corresponding to the second application.

In a possible design, the method further includes: automatically determining, by the terminal from an application corresponding to an application icon included on the non-docked bar on the first home screen, that an application that meets a preset condition is the first application; and automatically determining, by the terminal from an application corresponding to an application icon included on a non-docked bar on the second home screen, that an application that meets the preset condition is the second application. The preset condition is at least one of the following conditions: an application that is most frequently used, an application that is latest installed, an application that is latest updated, and an application that is abnormally exited.

According to a third aspect, this application provides a processing method, applied to a terminal including at least a first home screen and a second home screen, where the method includes: displaying, by the terminal, the first home screen, where a floating menu on the first home screen includes a first application icon corresponding to a first application; and automatically determining, by the terminal, a second application that meets a preset condition, and replacing the first application icon on the floating menu on the first home screen with a second application icon, where the second application icon corresponds to the second application, and the preset condition is at least one of the following conditions: an application that is most frequently used, an application that is latest installed, an application that is latest updated, and an application that is abnormally exited.

According to a fourth aspect, this application provides a processing method, applied to a terminal including at least a first home screen and a second home screen, where the method includes: displaying, by the terminal, HiBoard, where the HiBoard includes a first application icon corresponding to a first application, and the first home screen on the terminal includes an application icon corresponding to the first application; and automatically determining, by the terminal, a second application that meets a preset condition, and replacing the first application icon with a second application icon, where the second application icon corresponds to the second application, and the preset condition is at least one of the following conditions: an application that is most frequently used, an application that is latest installed, an application that is latest updated, and an application that is abnormally exited.

According to a fifth aspect, a terminal is provided, including at least a first home screen and a second home screen, where the terminal includes: a display unit, configured to display the first home screen, where a docked bar on the first home screen includes a first application icon corresponding to a first application; and a processing unit, configured to automatically determine a second application that meets a preset condition, and replace the first application icon on the docked bar on the first home screen displayed on the display unit with a second application icon, where the second application icon corresponds to the second application, and the preset condition is at least one of the following conditions: an application that is most frequently used, an application that is latest installed, an application that is latest updated, and an application that is abnormally exited.

In a possible design, a non-docked bar on the first home screen displayed on the display unit includes a third application icon corresponding to the second application.

In a possible design, the processing unit is further configured to automatically determine, from an application corresponding to an application icon included on the non-docked bar on the first home screen, that an application that meets the preset condition is the second application.

In a possible design, the processing unit is further configured to detect a first operation of a user; the display unit is further configured to: in response to the first operation detected by the processing unit, display a screen including at least one policy option; and the processing unit is further configured to: detect a user's selection operation on the at least one policy option, and determine the preset condition based on a policy option selected by the user.

In a possible design, the docked bar on the first home screen displayed on the display unit further includes an application icon corresponding to a third application, and the non-docked bar on the first home screen does not include the application icon corresponding to the third application.

In a possible design, the third application is an application that is automatically determined by the processing unit based on applications corresponding to application icons included on non-docked bars on all home screens and that meets the preset condition.

In a possible design, the processing unit is further configured to: replace the first application icon on the docked bar on the first home screen displayed on the display unit with the second application icon, and keep an application icon included on the non-docked bar on the first home screen unchanged.

In a possible design, the display unit is further configured to: in response to a user's operation of switching from the first home screen to the second home screen, display the second home screen, where a docked bar on the second home screen includes a fourth application icon corresponding to a fourth application, and the first home screen does not include an application icon corresponding to the fourth application.

In a possible design, the fourth application is an application that is automatically determined by the processing unit from an application corresponding to an application icon included on a non-docked bar on the second home screen and that meets the preset condition.

According to a sixth aspect, a terminal is provided, including at least a first home screen and a second home screen, where the terminal includes: a display unit, configured to display the first home screen, where a docked bar on the first home screen includes a first application icon corresponding to a first application; and a processing unit, configured to detect a user's operation, where the operation is used to instruct the terminal to switch from the first home screen displayed on the display unit to the second home screen. The display unit is further configured to: in response to the user's operation detected by the processing unit, display the second home screen, where a docked bar on the second home screen includes a second application icon corresponding to a second application, and the second application is different from the first application.

In a possible design, a non-docked bar on the first home screen displayed on the display unit includes a third application icon corresponding to the first application, and the non-docked bar on the first home screen further includes a fourth application icon corresponding to the second application.

In a possible design, the processing unit is further configured to automatically determine, from an application corresponding to an application icon included on the non-docked bar on the first home screen, that an application that meets a preset condition is the first application; and the processing unit is further configured to automatically determine, from an application corresponding to an application icon included on a non-docked bar on the second home screen, that an application that meets the preset condition is the second application. The preset condition is at least one of the following conditions: an application that is most frequently used, an application that is latest installed, an application that is latest updated, and an application that is abnormally exited.

According to a seventh aspect, a terminal is provided, including at least a first home screen and a second home screen, where the terminal includes: a display unit, configured to display the first home screen, where a floating menu on the first home screen includes a first application icon corresponding to a first application; and a processing unit, configured to automatically determine a second application that meets a preset condition, and replace the first application icon on the floating menu on the first home screen displayed on the display unit with a second application icon, where the second application icon corresponds to the second application, and the preset condition is at least one of the following conditions: an application that is most frequently used, an application that is latest installed, an application that is latest updated, and an application that is abnormally exited.

According to an eighth aspect, a terminal is provided, including at least a first home screen and a second home screen, where the terminal includes: a display unit, configured to display HiBoard, where the HiBoard includes a first application icon corresponding to a first application, and the first home screen on the terminal includes an application icon corresponding to the first application; and a processing unit, configured to automatically determine a second application that meets a preset condition, and replace the first application icon displayed on the display unit with a second application icon, where the second application icon corresponds to the second application, and the preset condition is at least one of the following conditions: an application that is most frequently used, an application that is latest installed, an application that is latest updated, and an application that is abnormally exited.

According to a ninth aspect, a computer storage medium is provided, including a computer instruction, where when the computer instruction is run on a terminal, the terminal is enabled to perform the processing method according to any one of the first aspect to the fourth aspect.

According to a tenth aspect, a computer program product is provided, where when the computer program product is run on a computer, the computer is enabled to perform the processing method according to any one of the first aspect to the fourth aspect.

According to an eleventh aspect, an apparatus is provided, including one or more processors and one or more memories that are coupled to each other, where the one or more memories are configured to store computer program code, the computer program code includes a computer instruction, and when the one or more processors execute the computer instruction, the apparatus performs the method according to any one of the first aspect to the fourth aspect.

According to a twelfth aspect, an apparatus is provided, including a display coupled to one or more processors and one or more memories, where the display is configured to perform displaying according to an instruction from the processor.

In a possible design, the apparatus is a wireless terminal.

BRIEF DESCRIPTION OF DRAWINGS

FIG. 2(1) and FIG. 2(2) are a schematic diagram 1 of an example of a screen on a terminal according to this application;

FIG. 6(1) and FIG. 6(2) are a schematic diagram 5 of an example of a screen on a terminal according to this application;

DESCRIPTION OF EMBODIMENTS

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the description of this application, unless otherwise stated, "a plurality of" means two or more than two.

Rapid development of internet technologies leads to an application increase in both type and quantity on intelligent terminals. A large quantity of applications bring a variety of applications to a user, but also bring a difficulty in quickly searching for an application to the user. Therefore, this application provides a processing method, so that the user quickly finds a desired application.

The processing method provided in this application may be performed by a display apparatus on a terminal. The display apparatus may be a mobile phone 100 shown in FIG. 1. Alternatively, the display apparatus on the terminal may be a central processing unit (CPU) of the terminal, or a control module that is configured to perform the processing method on the terminal.

For example, the terminal in this application may be a mobile phone (such as the mobile phone 100 shown in FIG. 1), a tablet computer, a personal computer (PC), a personal digital assistant (PDA), a smart watch, a netbook, a wearable electronic device, or an in-vehicle terminal on which an application program can be installed and an application icon can be displayed. A specific form of the terminal is not specially limited in this application.

Figure 1:
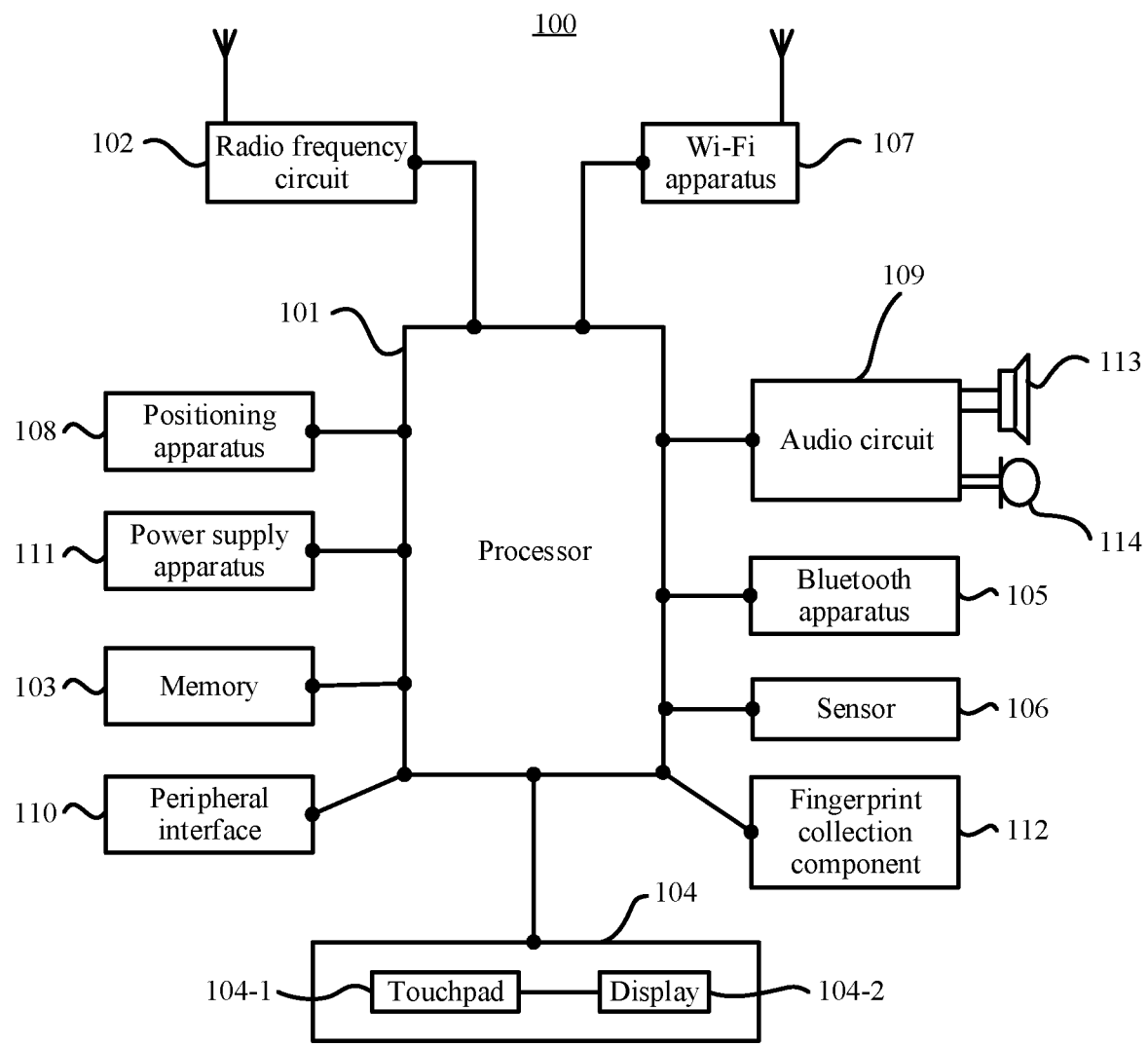
FIG. 1 is a schematic diagram of a hardware structure of a terminal according to this application.

As shown in FIG. 1, for example, the mobile phone 100 is used as the terminal, and the mobile phone 100 may specifically include components such as a processor 101, a radio frequency (RF) circuit 102, a memory 103, a touchscreen 104, a Bluetooth apparatus 105, one or more sensors 106, a WI-FI apparatus 107, a positioning apparatus 108, an audio circuit 109, a peripheral interface 110, and a power supply apparatus 111. The components may perform communication by using one or more communications buses or signal cables (not shown in FIG. 1). A person skilled in the art may understand that a hardware structure shown in FIG. 1 does not constitute a limitation on the mobile phone, and the mobile phone 100 may include more or fewer components than those shown in the figure, may combine some components, or may have different component arrangements.

The following describes in detail the components of the mobile phone 100 with reference to FIG. 1.

The processor 101 is a control center of the mobile phone 100. The processor 101 is connected to all parts of the mobile phone 100 by using various interfaces and cables, runs or executes an application program stored in the memory 103, and invokes data stored in the memory 103, to perform various functions of the mobile phone 100 and process data. In some embodiments, the processor 101 may include one or more processing units. For example, the processor 101 may be a chip Kirin 960 manufactured by Huawei Technologies Co., Ltd. In some embodiments of this application, the processor 101 may further include a fingerprint verification chip, configured to verify a collected fingerprint.

The radio frequency circuit 102 may be configured to send and receive a radio signal in an information receiving and sending process or a call process. Particularly, after receiving downlink data from a base station, the radio frequency circuit 102 may send the downlink data to the processor 101 for processing, and sends related uplink data to the base station. The radio frequency circuit usually includes but is not limited to an antenna, at least one amplifier, a transceiver, a coupler, a low noise amplifier, a duplexer, and the like. In addition, the radio frequency circuit 102 may further communicate with another device through wireless communication. Any communication standard or protocol may be used for the wireless communication, including but not limited to a global system for mobile communications, a general packet radio service, code division multiple access, wideband code division multiple access, long term evolution, an email, a short message service, and the like.

The memory 103 is configured to store an application program and data. The processor 101 runs the application program and reads the data that are stored in the memory 103, to execute various functions of the mobile phone 100 and process data. The memory 103 mainly includes a program storage area and a data storage area. The program storage area may store an operating system, and an application program required for performing at least one function (such as a voice playing function or an image playing function). The data storage area may store data (such as audio data or a phone book) created based on use of the mobile phone 100. In addition, the memory 103 may include a high-speed random access memory (Random Access Memory, RAM), and may further include a non-volatile memory such as a magnetic disk storage device, a flash memory, or another volatile solid-state storage device. The memory 103 may store various operating systems such as an iOS® operating system developed by Apple Inc. and an Android® operating system developed by Google LLC. The memory 103 may be standalone, and is connected to the processor 101 by using the communication bus; or the memory 103 may be integrated with the processor 101.

The touchscreen 104 may specifically include a touchpad 104-1 and a display 104-2.

The touchpad 104-1 may collect a touch event performed by a user on or near the mobile phone 100 (for example, an operation performed by the user on or near the touchpad 104-1 by using any proper object such as a finger or a stylus), and send collected touch information to another component (for example, the processor 101). The touch event of the user near the touchpad 104-1 may be referred to as floating touch control. The floating touch control may mean that the user does not need to directly touch the touchpad to select, move, or drag a target (for example, an icon), and instead, the user only needs to be near a device to implement a desired function. In addition, the touchpad 104-1 may be implemented in a plurality of types such as a resistive type, a capacitive type, an infrared type, and a surface acoustic wave type.

The display (also referred to as a display screen) 104-2 may be configured to display information entered by the user or information provided for the user, and various menus of the mobile phone 100. The display 104-2 may be configured in a form such as a liquid crystal display, or an organic light-emitting diode. The touchpad 104-1 may cover the display 104-2. After detecting the touch event on or near the touchpad 104-1, the touchpad 104-1 transfers the touch event to the processor 101 to determine a type of the touch event. Then the processor 101 may provide corresponding visual output on the display 104-2 based on the type of the touch event. Although in FIG. 1, the touchpad 104-1 and the display 104-2 are used as two independent components to implement input and output functions of the mobile phone 100, in some embodiments, the touchpad 104-1 and the display screen 104-2 may be integrated to implement the input and output functions of the mobile phone 100. It may be understood that the touchscreen 104 is made by stacking a plurality of layers of materials. In the embodiments of this application, only the touchpad (layer) and the display screen (layer) are displayed, and other layers are not recorded in the embodiments of this application. In addition, the touchpad 104-1 may be disposed on a front side of the mobile phone 100 in a full panel form, and the display screen 104-2 may also be disposed on the front side of the mobile phone 100 in a full panel form, so that a bezel-less structure can be implemented on the front side of the mobile phone.

In addition, the mobile phone 100 may further have a fingerprint recognition function. For example, a fingerprint collection component 112 may be disposed on a back side of the mobile phone 100 (for example, below a rear-facing camera), or the fingerprint recognizer 112 may be disposed on the front side of the mobile phone 100 (for example, below the touchscreen 104). For another example, a fingerprint collection device 112 may be disposed on the touchscreen 104 to implement the fingerprint recognition function. In other words, the fingerprint collection device 112 and the touchscreen 104 may be integrated together to implement the fingerprint recognition function of the mobile phone 100. In this case, the fingerprint collection device 112 is disposed on the touchscreen 104, and may be a part of the touchscreen 104, or may be disposed on the touchscreen 104 in another manner. A main component of the fingerprint collection device 112 in the embodiments of this application is a fingerprint sensor. The fingerprint sensor may use any type of sensing technology, including but not limited to an optical sensing technology, a capacitive sensing technology, a piezoelectric sensing technology, an ultrasonic sensing technology, and the like.

The mobile phone 100 may further include the Bluetooth apparatus 105, configured to implement data exchange between the mobile phone 100 and another short-range device (for example, a mobile phone or a smart watch). In the embodiments of this application, the Bluetooth apparatus may be an integrated circuit, a Bluetooth chip, or the like.

The mobile phone 100 may further include at least one type of sensor 106, such as a light sensor, a motion sensor, and another sensor. Specifically, the light sensor may include an ambient light sensor and a proximity sensor. The ambient light sensor may adjust luminance of the display of the touchscreen 104 based on intensity of ambient light. The proximity sensor may power off the display when the mobile phone 100 approaches an ear. As a type of the motion sensor, an accelerometer sensor may detect acceleration values in directions (usually on three axes). The accelerometer sensor may detect a value and a direction of gravity when the accelerometer sensor is stationary, and may be used for an application for recognizing a posture (such as screen switching between a landscape mode and portrait mode, a related game, and magnetometer posture calibration) of the mobile phone, a function related to vibration recognition (such as a pedometer and a knock), and the like. Other sensors such as a gyroscope, a barometer, a hygrometer, a thermometer, and an infrared sensor may also be configured on the mobile phone 100. Details are not described herein.

The Wi-Fi apparatus 107 is configured to provide the mobile phone 100 with network access conforming to a Wi-Fi related standard protocol. The mobile phone 100 may access a Wi-Fi access point by using the Wi-Fi apparatus 107, to help the user receive and send an email, browse a web page, access streaming media, and the like. The Wi-Fi apparatus 107 provides wireless broadband internet access for the user. In some other embodiments, the Wi-Fi apparatus 107 may also be used as a Wi-Fi wireless access point, to provide Wi-Fi network access for another device.

The positioning apparatus 108 is configured to provide a geographic location for the mobile phone 100. It may be understood that the positioning apparatus 108 may be specifically a receiver of a positioning system such as a global positioning system (Global Positioning System, GPS), the BeiDou navigation satellite system, or the Russian GLONASS. After receiving the geographic location sent by the positioning system, the positioning apparatus 108 sends the information to the processor 101 for processing, or sends the information to the memory 103 for storage. In some other embodiments, the positioning apparatus 108 may be alternatively a receiver of an assisted global positioning system (Assisted Global Positioning System, AGPS). The AGPS system assists the positioning apparatus 108 as an assisted server, to implement ranging and positioning services. In this case, the assisted positioning server communicates with a device such as the positioning apparatus 108 (namely, the GPS receiver) of the mobile phone 100 by using a wireless communications network, to provide positioning assistance. In some other embodiments, the positioning apparatus 108 may be alternatively an apparatus using a positioning technology based on a Wi-Fi access point. Because each Wi-Fi access point has a globally unique media access control (Media Access Control, MAC) address, when Wi-Fi is enabled, the device may scan and collect broadcast signals of nearby Wi-Fi access points, and therefore can obtain MAC addresses broadcast by the Wi-Fi access points. The device sends, to a location server by using a wireless communications network, data (for example, the MAC addresses) that can be used to identify the Wi-Fi access points. The location server finds a geographic location of each Wi-Fi access point, calculates a geographic location of the device in combination with strength of the Wi-Fi broadcast signals, and sends the geographic location of the device to the positioning apparatus 108 of the device.

The audio circuit 109, a speaker 113, and a microphone 114 may provide an audio interface between the user and the mobile phone 100. The audio circuit 109 may convert received audio data into an electrical signal and transmit the electrical signal to the speaker 113, and the speaker 113 converts the electrical signal into a sound signal for output. In addition, the microphone 114 converts a collected sound signal into an electrical signal, and the audio circuit 109 receives the electrical signal, converts the electrical signal into audio data, and then outputs the audio data to the RF circuit 102, to send the audio data to, for example, another mobile phone, or outputs the audio data to the memory 103 for further processing.

The peripheral interface 110 is configured to provide various interfaces for an external input/output device (for example, a keyboard, a mouse, an external display, an external memory, or a subscriber identity module card). For example, the peripheral interface 110 is connected to the mouse by using a universal serial bus (Universal Serial Bus, USB) interface, or connected, by using a metal contact on a card slot for the subscriber identity module card, to the subscriber identity module (Subscriber Identity Module, SIM) card provided by a telecommunications operator. The peripheral interface 110 may be configured to couple the external input/output peripheral device to the processor 101 and the memory 103.

In the embodiments of this application, the mobile phone 100 may communicate with another device in a device group through the peripheral interface 110. For example, the mobile phone 100 may receive, through the peripheral interface 110, to-be-displayed data sent by another device, and display the data. This is not limited in the embodiments of this application.

The mobile phone 100 may further include the power supply apparatus 111 (for example, a battery and a power supply management chip) that supplies power to the components. The battery may be logically connected to the processor 101 by using the power supply management chip, so that functions such as charging, discharging, and power consumption management are implemented by using the power supply apparatus 111.

Although not shown in FIG. 1, the mobile phone 100 may further include a camera (a front-facing camera and/or a rear-facing camera), a flash, a micro projection apparatus, a near field communication (Near Field Communication, NFC) apparatus, and the like. Details are not described herein.

All methods in the following embodiments may be implemented on the mobile phone 100 having the foregoing hardware structure.

Figure 8:
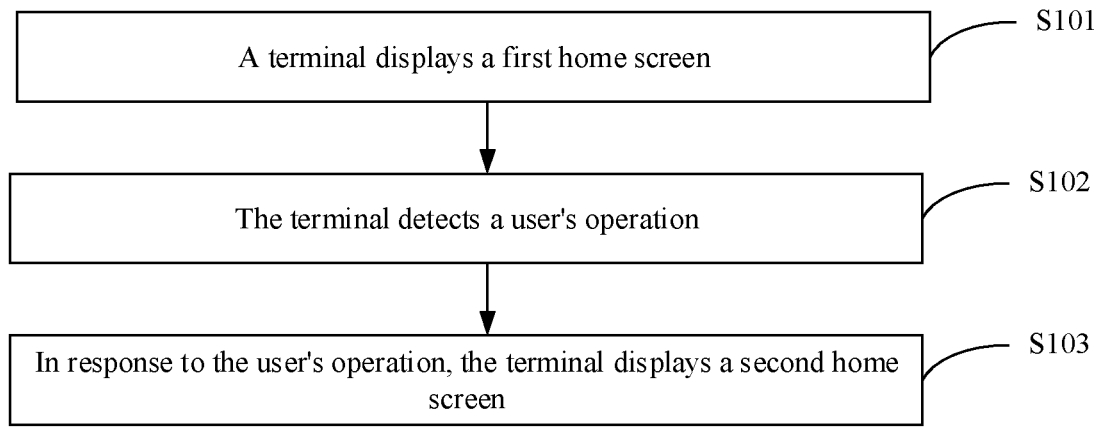
FIG. 8 is a schematic flowchart 1 of a processing method according to this application.

A processing method provided in this application is described below with reference to the accompanying drawings. Details are as follows:

FIG. 8 is a schematic flowchart of a processing method according to an embodiment of this application. The method is applied to a terminal including a plurality of home screens, and specifically includes the following steps.

S101. The terminal displays a first home screen.

The first home screen is one of the plurality of home screens on the terminal. A docked bar on the first home screen includes at least one first application icon. The first application icon corresponds to a first application, and is a shortcut corresponding to the first application. A user may operate the first application icon to start the first application. A quantity of first application icons is not limited in this embodiment of this application.

A non-docked bar on the first home screen includes an application icon corresponding to the first application. The user may also operate the application icon on the non-docked bar to start the first application. The application icon may be the same as or different from the first application icon.

It should be noted that the first application icon on the docked bar on the first home screen is the application shortcut generated corresponding to the first application that is automatically determined by the terminal from an application on the first home screen based on a user's application use habit and that meets a preset condition. The application on the first home screen may be applications corresponding to all application icons included on the first home screen, or may be applications corresponding to all application icons displayed on the first home screen. The preset condition is at least one of the following conditions: an application that is most frequently used, an application that is latest installed, an application that is latest updated, and an application that is abnormally exited.

For example, the terminal automatically determines, based on the user's habit, an application that is most frequently used or least frequently used by the user in a particular period, an application that has been updated recently, an application that has been used recently, an application that is latest installed, an application that has been used at a historical time, an application that has been abnormally exited recently, or an application that has been exited recently.

Figure 7:
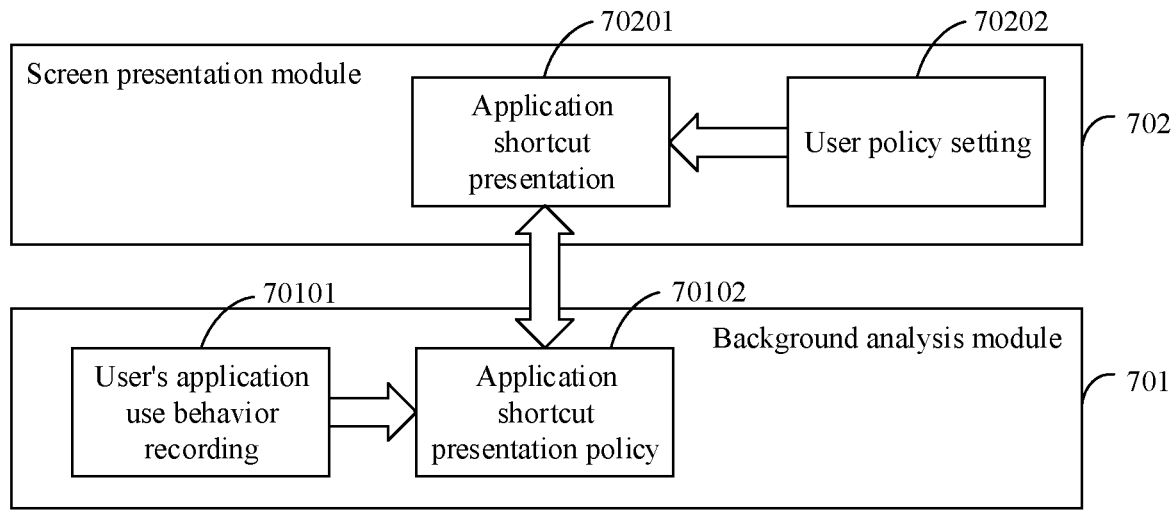
FIG. 7 is a schematic composition diagram 1 of a terminal according to this application.

Specifically, as shown in FIG. 7, in a process of generating the application shortcut by the terminal, a software module on the terminal may include a background analysis module 701 and a screen presentation module 702. The background analysis module 701 includes a user's application use behavior recording module 70101 and an application shortcut presentation policy module 70102. The screen presentation module 702 includes an application shortcut presentation module 70201 and a user policy setting module 70202.

The user's application use behavior recording module 70101 is configured to record information about applications in a mobile phone of the user and user's usage of these applications. Specific recorded information includes but is not limited to content in Table 1.

TABLE 1

Record of user's application use behavior

| Field | Content | Remarks |
|---|---|---|
| APP NAME | Application name | |
| APP ID | Application identifier, which is unique | |
| InstallTime | Time when an application is installed for the first time | |
| UpdateTime | Time when an application has been updated recently | |
| LaunchTimeList | Application launch time list | A time when an application has been started in a recent period is recorded. The recent period may be three days, one week, or the like. The period may be adjusted based on an actual requirement, and is one week by default. Statistics collection may be performed on a frequency of using each application in a period of time and an application that has been used recently, so as to analyze a rule of using each application. |
| LastQuitTime | Last time when an application is exited | |
| AppStatus | Application status | This field indicates a current status of an application, for example, the application is running, the application is normally exited, or the application |

TABLE 1-continued

Record of user's application use behavior

| Field | Content | Remarks |
|---|---|---|
| ScreenID | An identifier of a screen on which an application shortcut is placed | is abnormally exited. After each application is installed, a shortcut of the application is placed on a screen, for example, a screen 1, or a screen 2. Alternatively, a user may manually drag the application shortcut onto any screen (except HiBoard). The field records the identifier of the screen on which the application shortcut is placed. |

The application shortcut presentation policy module 70102 is configured to analyze and obtain, through statistics collection, a corresponding application list based on the record of the user's application use behavior and an application shortcut presentation policy set by the user. The presentation policy set by the user is classified into a screen-related policy and a screen-unrelated policy. Being screen-related means that analysis and comparison are performed based on only an application on a current screen. Being screen-unrelated means that analysis and comparison are performed based on all applications on the terminal. The two types of policies include but are not limited to the following subtypes:

(1) A policy for the application that is most (least) frequently used in the particular period: Statistics collection may be performed in any time period, or may be performed in different time periods, for example, in an on-duty time period and an off-duty time period, a weekend and a working day, or customized time periods. Specifically, statistics collection may be performed based on the LanchTimeList field, the APP NAME field, and the APP ID field in the record of the user's application use behavior. If statistics collection is performed in the on-duty time period and the off-duty time period, when statistics collection is performed on an application that is most frequently used in the on-duty time period, statistics collection is not performed on usage of the application in the off-duty time period; and when statistics collection is performed on an application that is most frequently used in the off-duty time period, statistics collection is not performed on usage of the application in the on-duty time period.

(2) A policy for the application that has been updated recently: Statistics collection may be performed based on the UpdateTime field, the APP NAME field, and the APP ID field in the record of the user's application use behavior.

(3) A policy for the application that has been used recently: Statistics collection may be performed based on the LanchTimeList field, the APP NAME field, and the APP ID field in the record of the user's application use behavior.

(4) A policy for the application that is latest installed: Statistics collection may be performed based on the InstallTime field, the APP NAME field, and the APP ID field in the record of the user's application use behavior.

(5) A policy for the application that has been used at the historical time: For example, it is 12:00 AM currently, and statistics collection is performed on an application used at 12:00 AM yesterday. The statistics collection may be performed based on the LanchTimeList field, the APP NAME field, and the APP ID field in the record of the user's application use behavior.

(6) A policy for the application that has been exited recently: Statistics collection may be performed based on the LastQuitTime field, the APP NAME field, and the APP ID field in the record of the user's application use behavior.

(7) A policy for the application that is abnormally exited: Statistics collection may be performed based on the AppStatus field, the APP NAME field, and the APP ID field in the record of the user's application use behavior.

The user policy setting module 70202 is configured to receive the application shortcut presentation policy selected by the user. In this embodiment of this application, the user may select the screen-related policy. The screen-related policy is further used for but not limited to the application that is most frequently used or least frequently used in the particular period, the application that has been updated recently, the application that has been used recently, the application that is latest installed, the application that has been used at the historical time, the application that has been abnormally exited recently, the application that has been exited recently, or the like. The user may further specify that a shortcut corresponding to a specific application is displayed on different home screens. A policy for presenting an application shortcut is not limited in this embodiment of this application.

The application shortcut presentation module 70201 is configured to input the policy selected by the user and an identifier of a current screen on the terminal, into the application shortcut presentation policy module 70102. Then, the application shortcut presentation policy module 70102 obtains, through analysis and statistics collection, a to-be-displayed application list, and feeds back the application list to the application shortcut presentation module 70201. The application shortcut presentation module 70201 generates an application shortcut corresponding to each application in the application list, and displays the application shortcut on a display screen.

For example, FIG. 2(1) shows the first home screen displayed on the terminal. The docked bar on the first home screen includes three first application icons: an application icon "phone", an application icon "WeChat", and an application icon "Alipay". The non-docked bar on the first home screen includes a plurality of application icons. It should be noted that the non-docked bar on the first home screen includes application icons that are the same as those on the docked bar, that is, the application icon "phone", the application icon "WeChat", and the application icon "Alipay".

S102. The terminal detects a user's operation.

The operation is used to instruct the terminal to switch from the first home screen to a second home screen. The switching operation may be flicking the screen on the terminal towards the left or the right, or flicking the screen upwards or downwards. A specific manner of the operation is not limited in this embodiment of this application.

S103. In response to the user's operation, the terminal displays the second home screen.

The second home screen is another of the plurality of home screens on the terminal. A docked bar on the second home screen includes at least one second application icon. The second application icon corresponds to a second application, and is a shortcut corresponding to the second application. The user may operate the second application icon to quickly start the second application. In addition, the second application and the first application are different applications. A quantity of second application icons is not limited in this embodiment of this application, and the quantity of second application icons may be the same as or different from the quantity of first application icons.

A non-docked bar on the second home screen also includes an application icon corresponding to the second application.

It should be noted that the second application icon on the docked bar on the second home screen is the application shortcut generated corresponding to the second application that is determined by the terminal from an application on the non-docked bar on the second home screen based on a user's habit. For a specific generation method, refer to the method for generating the first application icon in step S101. Details are not described herein again.

For example, FIG. 2(2) shows the second home screen displayed on the terminal. The docked bar on the second home screen includes three second application icons: an application icon "CMB", an application icon "contacts", and an application icon "messages". The non-docked bar on the second home screen includes a plurality of application icons. It should be noted that the non-docked bar on the second home screen includes application icons that are the same as those on the docked bar, that is, the application icon "CMB", the application icon "contacts", and the application icon "messages".

It should be noted that in the foregoing steps S101 to S103, the application icons on the non-docked bar on the first home screen and the application icons on the non-docked bar on the second home screen may keep unchanged.

Therefore, in this embodiment of this application, different application shortcuts are displayed on different home screens, so that the user can quickly start an application on a current home screen, thereby improving user experience.

It should be further noted that if the terminal has a total of M home screens, each home screen can display N application shortcuts. In this embodiment of this application, different application shortcuts can be displayed on different home screens. This is equivalent to that a total of M×N shortcuts can be displayed on the terminal. It can be learned that in this embodiment of this application, a quantity of application shortcuts presented on the terminal can also be increased, thereby helping improve user experience.

It should be further noted that displaying an application shortcut on a docked bar on a home screen is merely a display manner in this embodiment of this application. In this application, the application shortcut may be displayed on a floating window on a home screen, or the application shortcut may be displayed on HiBoard, a notification bar, or the like. A specific form for displaying the application shortcut is not limited in this application.

Figure 3:
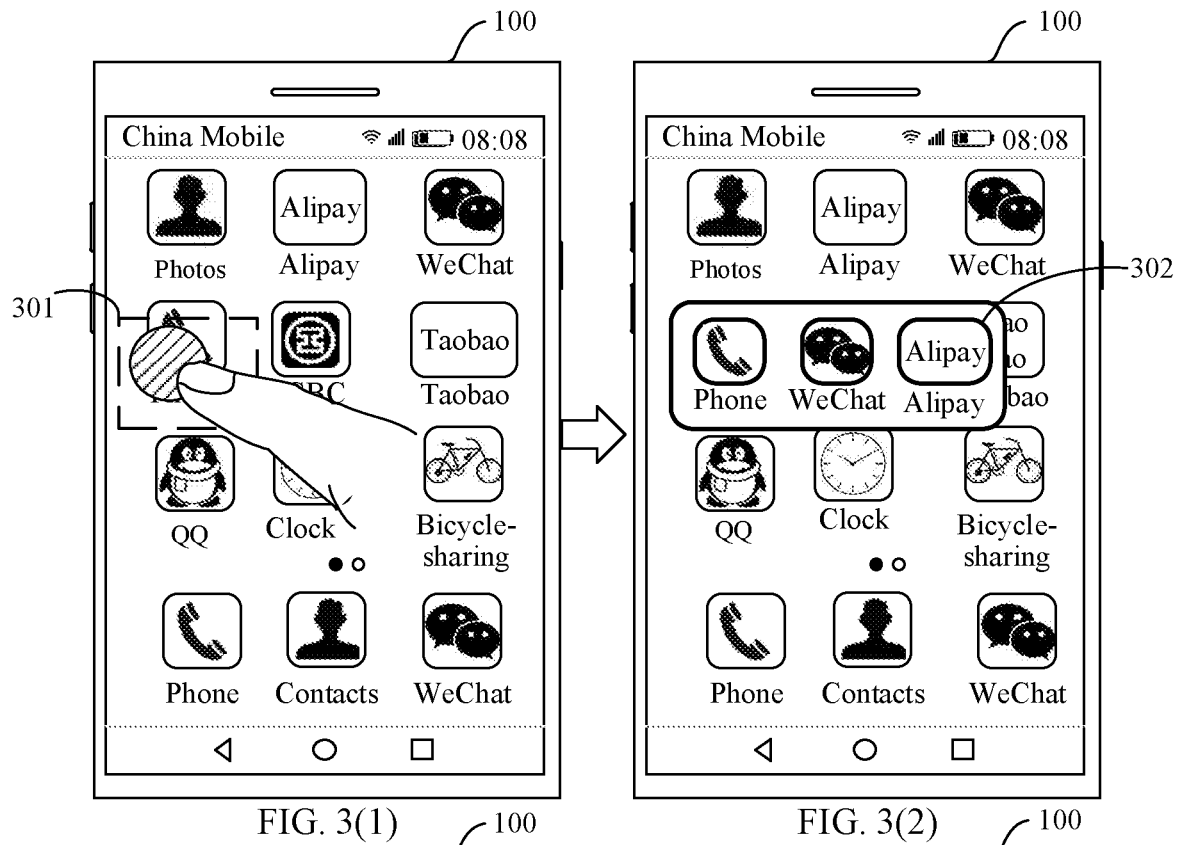
FIG. 3(1) to FIG. 3(4) are a schematic diagram 2 of an example of a screen on a terminal according to this application.
Figure 3:
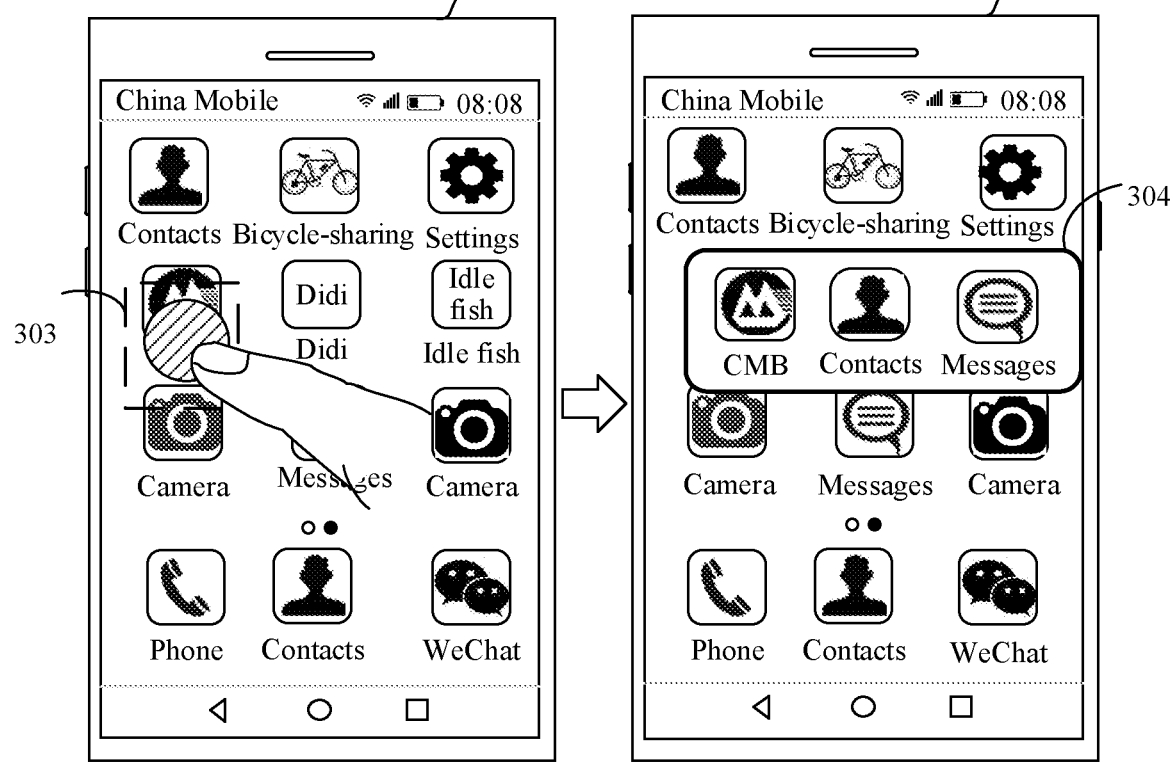

FIG. 3(1) to FIG. 3(4) show screens for displaying an application shortcut on a floating window on a home screen. FIG. 3(1) shows a home screen on the terminal. A floating dock 301 is displayed on the home screen. The user may tap the floating dock 301 to open a floating window 302 on the home screen. As shown in FIG. 3(2), the floating window 302 includes three application shortcuts: an application icon "phone", an application icon "WeChat", and an application icon "Alipay". The home screen displays application icons corresponding to the three application shortcuts, that is, the application icon "phone", the application icon "WeChat", and the application icon "Alipay". FIG. 3(3) shows another home screen on the terminal. A floating dock 303 is displayed on the home screen. The user may tap the floating dock 303 to open a floating window 304 on the home screen. As shown in FIG. 3(4), the floating window 304 includes three application shortcuts: an application icon "CMB", an application icon "contacts", and an application icon "messages". The home screen displays application icons corresponding to the three application shortcuts, that is, the application icon "CMB", the application icon "contacts", and the application icon "messages".

Figure 4:
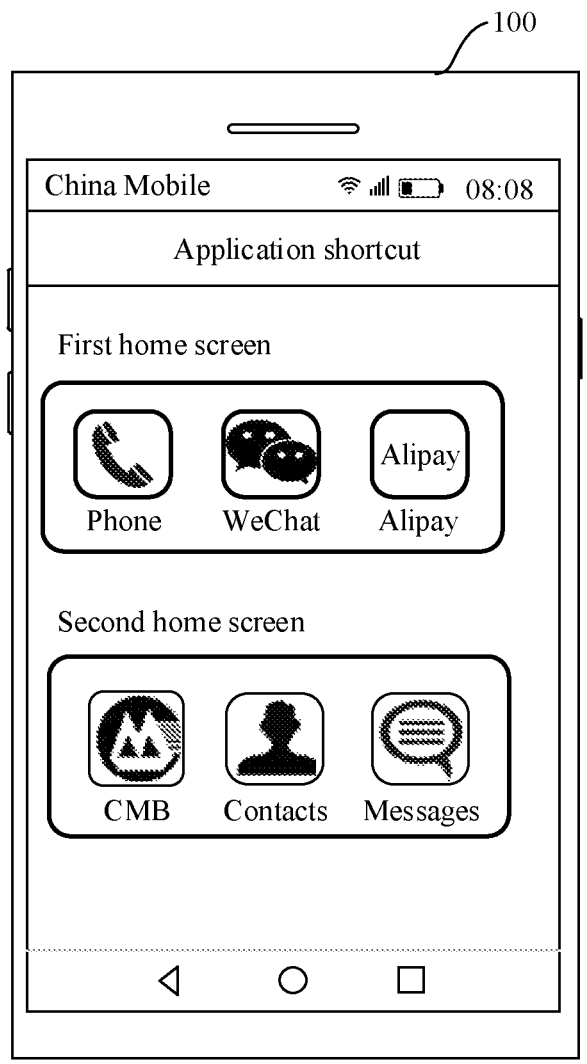
FIG. 4 is a schematic diagram 3 of an example of a screen on a terminal according to this application.

FIG. 4 shows a screen for displaying an application shortcut on HiBoard. The screen includes the application shortcuts displayed on the first home screen: the application icon "phone", the application icon "WeChat", and the application icon "Alipay", and the application shortcuts displayed on the second home screen: the application icon "CMB", the application icon "contacts", and the application icon "messages".

Figure 9:
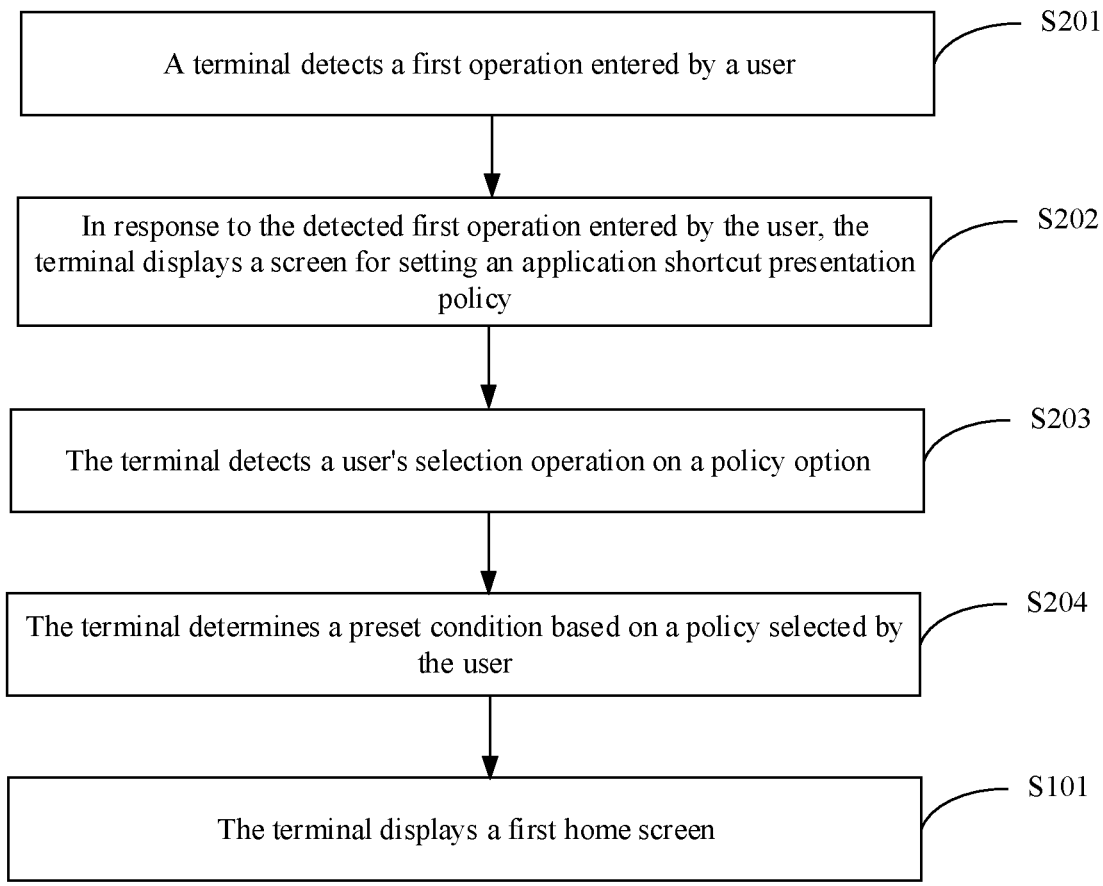
FIG. 9 is a schematic flowchart 2 of a processing method according to this application.

Further, before step S101 is performed, this application further includes a setting step of setting an application shortcut by the user. As shown in FIG. 9, a processing method provided in an embodiment of this application further includes the following steps.

S201. A terminal detects a first operation of a user.

Figure 5:
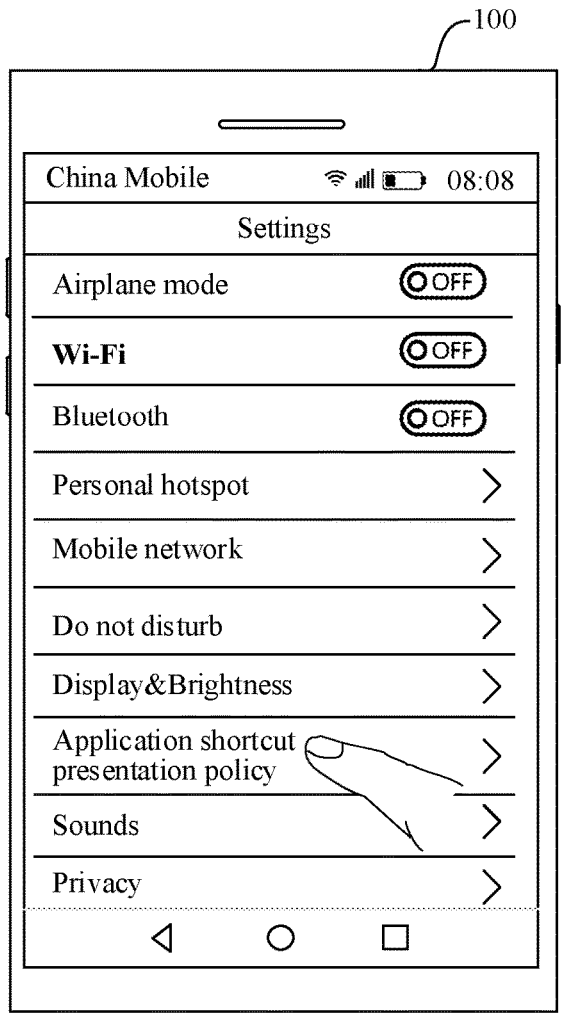
FIG. 5(1) and FIG. 5(2) are a schematic diagram 4 of an example of a screen on a terminal according to this application.
Figure 5:
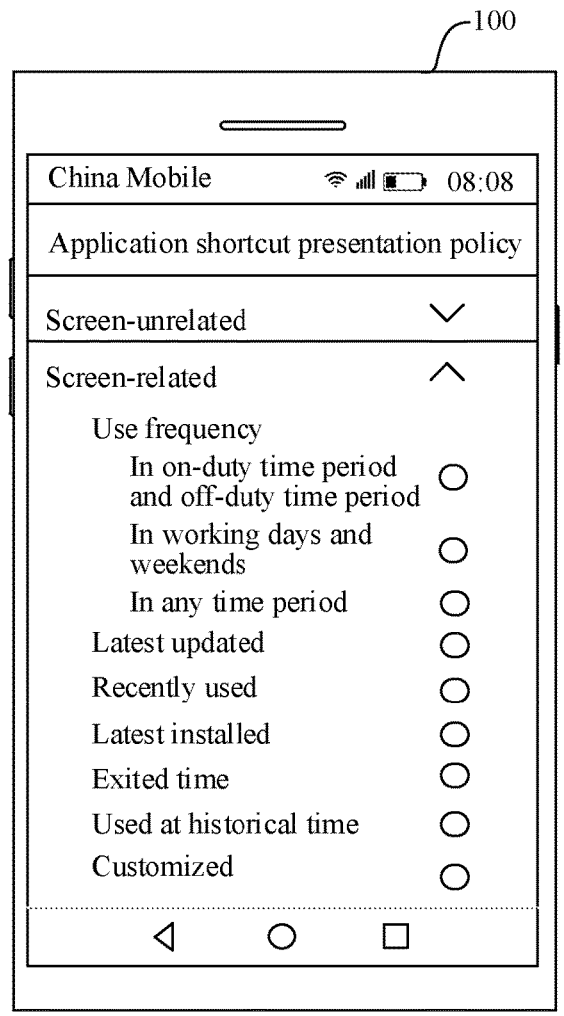

The first operation is used to open a screen including an application shortcut presentation policy option. As shown in FIG. 5(1), the first operation may be, for example, tapping the "application shortcut presentation policy" option on a "settings" home screen.

S202. In response to the detected first operation entered by the user, the terminal displays a screen for setting an application shortcut presentation policy.

The screen includes at least one policy option. The policy option includes a screen-related policy and a screen-irrelevant policy. The two types of policies are further classified into the following policies, including but not limited to a policy for an application that is most frequently used or least frequently used in a particular period, a policy for an application that has been updated recently, a policy for an application that has been used recently, a policy for an application that is latest installed, a policy for an application that has been used at a historical time, a policy for an application that has been abnormally exited recently, a policy for an application that has been exited recently, or the like.

FIG. 5(2) shows a screen for setting an application shortcut presentation policy on the terminal.

S203. The terminal detects a user's selection operation on the policy option.

Specifically, the user may select one policy, or may select a combination of a plurality of policies. This is not limited in this embodiment of this application.

S204. The terminal determines a preset condition based on a policy selected by the user.

Therefore, this embodiment of this application provides a method for setting an application shortcut presentation manner by a user, thereby improving user experience.

With reference to an actual application scenario, the following provides descriptions by using an example in which there are two application shortcut presentation policies on each home screen.

Specifically, it is assumed that a docked bar on each home screen on the terminal includes a maximum of P application icons.

The terminal may specify that a screen-unrelated policy is used for Q application icons. In this case, the Q application icons on the docked bar on each home screen on the terminal are application icons corresponding to Q applications that are automatically determined by the terminal from applications included on non-docked bars on all home screens and that meet the preset condition. It can be learned that the Q application icons on the docked bar on each home screen are the same.

The terminal may further specify that a screen-related policy is used for the other (P-Q) application icons. In this case, the (P-Q) application icons on each screen on the terminal are application icons corresponding to (P-Q) applications that are automatically determined by the terminal from applications included on a non-docked bar on each home screen and that meet the preset condition. It can be learned that the (P-Q) application icons on the docked bar on each home screen are different.

For example, FIG. 6(1) shows one of the home screens on the terminal (e.g., a first home screen), and a docked bar 602 on the home screen displays three application shortcuts. In other words, P is 3. An application icon "phone" is generated based on all applications on the terminal. In other words, Q is 1. An application icon "WeChat" and an application icon "Alipay" are generated based on applications on the current home screen. In other words, (P—Q) is 2. The remainder of the icons in FIG. 6(1) are thus in a non-docked bar. The non-docked bar of the first home screen of FIG. 6(1) includes an icon corresponding to a first application, which is a latest-installed application (e.g., the phone application). FIG. 6(2) shows another home screen on the terminal (e.g., a second home screen), and a docked bar 604 on the home screen displays three application shortcuts. An application icon "phone" is generated based on all applications on the terminal, and therefore is the same as the application icon in FIG. 6(1). An application icon "contacts" and an application icon "messages" are generated abased on applications on the current home screen, and therefore are different from the application icons in FIG. 6(1). The remainder of the icons in FIG. 6(2) are thus in a non-docked bar. The home screen of FIG. 6(2) includes a first area 606, a second area 608, and a third area 610. The second area 608 includes an icon corresponding to a second application, which is a most frequently used application (e.g., the messages application). The third area 610 includes one or more latest installed application icons, which include the icon corresponding to the first application (i.e., the phone application) that is also in the non-docked bar of the first home screen in FIG. 6(1). The first area 606 and the second area 608 do not overlap, and the first area 606 includes an icon corresponding to the second application (i.e., the messages application) as well.

Figure 10:
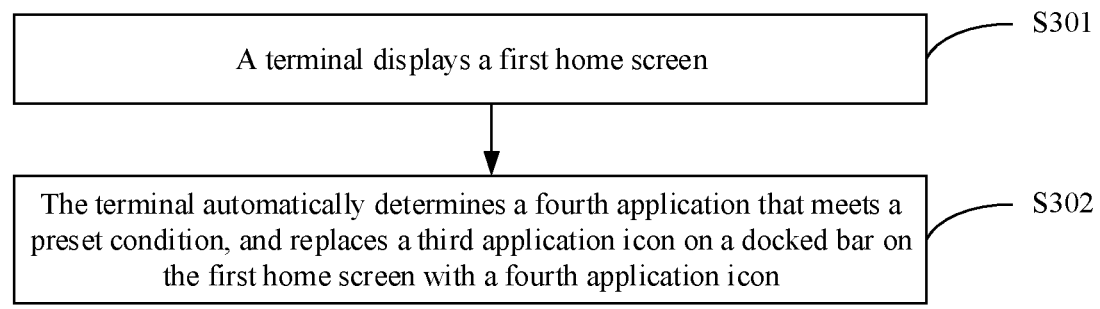
FIG. 10 is a schematic flowchart 3 of a processing method according to this application.

Further, FIG. 10 is a schematic flowchart of a processing method according to an embodiment of this application, and the method includes the following steps.

S301. A terminal displays a first home screen.

The first home screen is one of a plurality of home screens on the terminal. A docked bar on the first home screen includes at least one third application icon. The third application icon corresponds to a third application, and is a shortcut corresponding to the third application. A user may operate the third application icon to start the third application. A quantity of third application icons is not limited in this embodiment of this application.

A non-docked bar on the first home screen includes an application icon corresponding to the third application, and the application icon may be the same as or different from the third application icon.

It should be noted that a method for generating the third application icon may be the same as the method for generating the first application icon in step S101, or may be different from the method for generating the first application icon in step S101. For example, the third application icon may be a default application icon corresponding to an application on the terminal, or may be generated in another manner. This is not limited in this embodiment of this application.

S302. The terminal automatically determines a fourth application that meets a preset condition, and replaces the third application icon on the docked bar on the first home screen with a fourth application icon.

The non-docked bar on the first home screen includes the fourth application icon corresponding to the fourth application. The user may also operate the fourth application icon to start the fourth application. In other words, the fourth application is an application on the first home screen.

Specifically, the terminal automatically determines, from an application on the first home screen based on a user's application use habit, the fourth application that meets the preset condition, and generates the fourth application icon. The application on the first home screen may be applications corresponding to all application icons included on the first home screen, or may be applications corresponding to all application icons displayed on the first home screen. The preset condition is at least one of the following conditions: an application that is most frequently used, an application that is latest installed, an application that is latest updated, and an application that is abnormally exited.

It should be noted that in this step, an application icon on the non-docked bar on the first home screen may keep unchanged.

It should be further noted that for a method for generating the fourth application icon in this step, refer to the method for generating the first application icon in step S101. Details are not described herein again.

It may be understood that, to implement the foregoing functions, the terminal and the like include corresponding hardware structures and/or software modules for performing the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present invention.

In the embodiments of this application, the terminal may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that in this embodiment of the present invention, division into the modules is an example, is merely a logical function division, and may be other division in an actual implementation.

Figure 11:
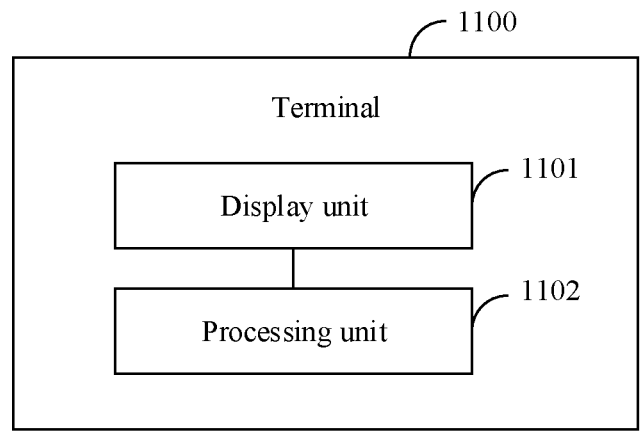
FIG. 11 is a schematic composition diagram 2 of a terminal according to this application.

When functional modules are obtained through division based on corresponding functions, FIG. 11 is a schematic diagram of a possible structure of a terminal in the foregoing embodiments. As shown in FIG. 11, the terminal 1100 includes a display unit 1101 and a processing unit 1102.

The display unit 1101 is configured to support the terminal to perform steps S101 and S103 in FIG. 8, step S202 in FIG. 9, step S301 in FIG. 10, and/or another process of the technology described in this specification. The processing unit 1102 is configured to support the terminal to perform step S102 in FIG. 8, steps S201, S203, and S204 in FIG. 9, step S302 in FIG. 10, and/or another process of the technology described in this specification.

All related content of the steps in the foregoing method embodiments may be cited in function descriptions of corresponding functional modules. Details are not described herein again.

Certainly, the terminal 1100 may further include a storage unit, configured to store program code, data, and the like. The terminal 1100 may further include a communications unit, used by the terminal to interact with another device. In addition, functions that can be specifically implemented by the functional units include but are not limited to functions corresponding to the method steps in the foregoing examples. For detailed descriptions of other units of the terminal 1100, refer to the detailed descriptions of the method steps corresponding to the units. Details are not described in this embodiment of this application again.

When an integrated unit is used, the processing unit may be a processing module of the terminal. The display unit may be a display module, for example, a touchscreen. The communications unit may be a communications module of the terminal, for example, an RF circuit, a Wi-Fi module, or a Bluetooth module. The storage unit may be a storage module of the terminal.

Figure 12:
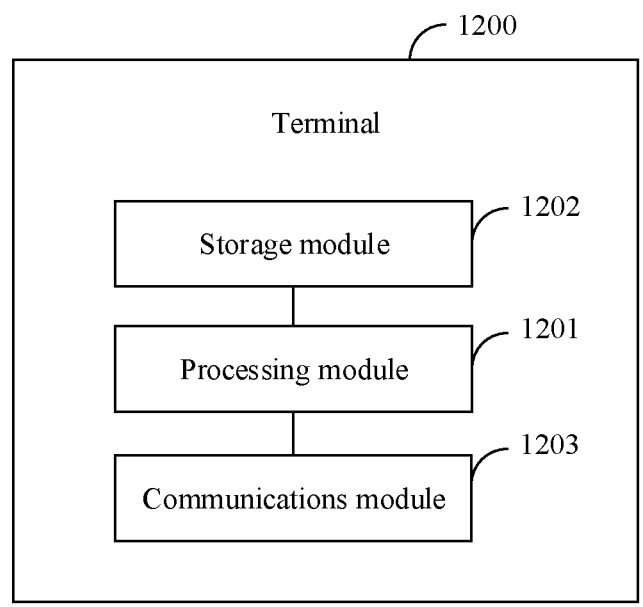
FIG. 12 is a schematic composition diagram 3 of a terminal according to this application.

FIG. 12 is a schematic diagram of a possible structure of a terminal in the foregoing embodiments. The terminal 1200 includes a processing module 1201, a storage module 1202, and a communications module 1203. The processing module 1201 is configured to perform control management on an action of the terminal. The storage module 1202 is configured to store program code and data of the terminal. The communications module 1203 is configured to communicate with another terminal. The processing module 1201 may be a processor or a controller, such as a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA), or another programmable logic device, a transistor logic device, a hardware component, or any combination thereof. The processor may implement or execute various example logical blocks, modules, and circuits described with reference to content disclosed in the present invention. The processor may be a combination of processors implementing a computing function, for example, a combination of one or more microprocessors, or a combination of the DSP and a microprocessor. The communications module 1203 may be a transceiver, a transceiver circuit, a communications interface, or the like. The storage module 1202 may be a memory.

When the processing module 1201 is a processor (the processor 101 in FIG. 1), the communications module 1203 is an RF transceiver circuit (the radio frequency circuit 102 in FIG. 1), and the storage module 1202 is a memory (the memory 103 in FIG. 1), the terminal provided in this embodiment of this application may be the terminal 100 in FIG. 1. The communications module 1203 may include not only the RF circuit, but also a Wi-Fi module and a Bluetooth module. Communications modules such as an RF circuit, a Wi-Fi module, and a Bluetooth module may be collectively referred to as a communications interface. The processor, the communications interface, and the memory may be coupled together by using a bus.

The foregoing descriptions of the implementations allow a person skilled in the art to clearly understand that, for the purpose of convenient and brief description, division into the foregoing function modules is used as an example for illustration. In actual application, the foregoing functions may be allocated to different functional modules and implemented based on a requirement, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the modules or units is merely logical function division, and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The storage medium includes any medium that can store program code, such as a flash memory, a removable hard disk, a read-only memory, a random access memory, a magnetic disk, an optical disc, or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:
1. A terminal, comprising:
one or more memories comprising instructions; and
one or more processors coupled to the one or more memories and configured to execute the instructions to cause the terminal to:
display a first display interface, wherein a non-docked bar on the first display interface comprises an icon corresponding to a first application, wherein the first application is a latest installed application;

detect a first user operation; and display, in response to the first user operation, a second display interface, wherein the second display interface comprises a first area, a second area, and a third area, wherein the second area comprises one or more most frequently used application icons, including an icon corresponding to a second application, wherein the third area comprises one or more latest installed application icons, including an icon corresponding to the first application, wherein the first area and the second area do not overlap, and the first area comprises an icon corresponding to the second application, and wherein a top area of each of the first display interface and the second display interface comprises a status bar that includes same signal, time, and battery indications.

2. The terminal of claim 1, wherein the first user operation is swiping a screen of the terminal to the left.

3. The terminal of claim 1, wherein the first display interface does not comprise an icon corresponding to the second application.

4. The terminal of claim 1, wherein the second area does not include icons in a corresponding second area of the first display interface.

5. The terminal of claim 1, wherein the second area and the third area are located proximate to an edge of a screen of the terminal and adjacent to each other.

6. The terminal of claim 1, wherein the processor is further configured to execute the instructions to cause the terminal to:

detect a second user operation; and display, in response to the second user operation, a third display interface, wherein a docked bar on the first display interface and a docked bar on the third display interface contain icons corresponding to a same application.

7. The terminal of claim 6, wherein the second user operation is swiping a screen of the terminal to the right.

8. The terminal of claim 6, wherein the icons corresponding to the same application correspond to a phone application, and wherein a top area of the third display interface comprises a status bar that includes same signal, time, and battery indications as the status bar located at the top area of each of the first display interface and the second display interface.

9. The terminal of claim 1, wherein a docked bar on the first display interface further comprises an icon corresponding to a fourth application, and wherein the non-docked bar on the first display interface does not comprise an icon corresponding to the fourth application.

10. The terminal of claim 9, wherein a docked bar on the second display interface comprises an icon corresponding to a fifth application, and wherein the first display interface does not comprise an icon corresponding to the fifth application.

11. The terminal of claim 1, wherein a docked bar on the second display interface is located on the second area and the third area.

12. The terminal of claim 1, wherein the second area and the third area are located in an area corresponding to the non-docked bar of the first display interface.

13. A non-transitory computer-readable storage medium having computer-executable instructions stored thereon that, when executed by one or more processors, cause a terminal to:

display a first display interface, wherein a non-docked bar on the first display interface comprises an icon corresponding to a first application, wherein the first application is a latest installed application;

detect a first user operation; and display, in response to the first user operation, a second display interface, wherein the second display interface comprises a first area, a second area, and a third area, wherein the second area comprises one or more most frequently used application icons, including an icon corresponding to a second application, wherein the third area comprises one or more latest installed application icons, including an icon corresponding to the first application, wherein the first area and the second area do not overlap, and the first area comprises an icon corresponding to the second application, and wherein a top area of each of the first display interface and the second display interface comprises a status bar that includes same signal, time, and battery indications.

14. The non-transitory computer-readable storage medium of claim 13, wherein the first user operation is swiping a screen of the terminal to the left.

15. The non-transitory computer-readable storage medium of claim 13, wherein the first display interface does not comprise an icon corresponding to the second application.

16. The non-transitory computer-readable storage medium of claim 13, wherein the second area does not include icons in a corresponding second area of the first display interface.

17. The non-transitory computer-readable storage medium of claim 13, wherein the second area and the third area are located proximate to an edge of a screen of the terminal and adjacent to each other.

18. The non-transitory computer-readable storage medium of claim 13, wherein a docked bar on the second display interface is located on the second area and the third area.

19. The non-transitory computer-readable storage medium of claim 13, wherein the second area and the third area are located in an area corresponding to the non-docked bar of the first display interface.

20. The non-transitory computer-readable storage medium of claim 13, wherein the instructions, when executed by the one or more processors, cause the terminal to:

detect a second user operation; and display, in response to the second user operation, a third display interface, wherein a docked bar on the first display interface and a docked bar on the third display interface contain icons corresponding to a same application.

* * * * *